United States Patent [19]

Huang

[11] Patent Number: 4,875,205

[45] Date of Patent: Oct. 17, 1989

[54] CROSSTALK REDUCTION IN UNSHIELDED TWISTED-PAIR LINES

[75] Inventor: Fred G. Huang, Folsom, Calif.

[73] Assignee: Hewlett-Packard Company, Palo Alto, Calif.

[21] Appl. No.: 291,375

[22] Filed: Dec. 23, 1988

Related U.S. Application Data

[63] Continuation of Ser. No. 84,960, Aug. 13, 1987, abandoned.

[51] Int. Cl.⁴ ............................................... H04J 15/00
[52] U.S. Cl. ............................................ 370/6; 375/7; 375/36
[58] Field of Search ............... 370/6, 97, 85, 86; 375/7, 3, 36; 340/825.5, 825.51

[56] References Cited

U.S. PATENT DOCUMENTS

| | | | |
|---|---|---|---|
| 4,472,712 | 9/1984 | Ault et al. | 370/85 |
| 4,602,364 | 7/1986 | Herman et al. | 370/85 |
| 4,602,366 | 7/1986 | Takumi | 370/85 |

Primary Examiner—Douglas W. Olms

[57] ABSTRACT

A method of reducing crosstalk in unshielded twisted-pair (TP) lines interconnecting transceiver Hub and Pod elements of an IEEE 802.3 network is disclosed. Each element is connected by a four-wire full-duplex pair of unshielded TP wires which are prone to crosstalk noise induced by proximity to other TP wires. The crosstalk noise is reduced by (i) the collision protocol, and (ii) employing different drive levels in the Hub and the Pod. By having the Pod transmit at a higher voltage level then the Hub, the signal-to-crosstalk noise ratio at the Hub is optimized, allowing for highly reliable communications at up to 10 milion bits per second. A collision protocol specified by the IEEE 802,3 standard further reduces crosstalk noise at the Hub.

4 Claims, 1 Drawing Sheet

CROSSTALK REDUCTION IN UNSHIELDED TWISTED-PAIR LINES

This application is a continuation of application Ser. No. 07/084,960, filed Aug. 13, 1987, now abandoned.

FIELD OF THE INVENTION

This invention relates to interconnection of electronic equipment in a local area network and, more particularly, to interconnection by unshielded twisted-pair wires of equipment in an IEEE 802.3 local network permitting data transfer at 10 million bits per second.

BACKGROUND OF THE INVENTION

Interconnection of electronic equipment located at a premises is commonly performed by coaxial cable meeting rigorous standards. Shielded coax cable allows interconnection in a local area network (LAN) covering more than 300 linear feet distance. This is because external radio frequency (RF) energy is not induced in shielded coax cable and because crosstalk energy between parallel cables is suppressed by the use of such cable.

Installing coax cable in a premises is costly and disruptive to the work being performed. In many cases, holes must be made in walls and/or floors and, possibly, an entire subflooring must be installed, to permit routing of coax cable. Once a particular cabling arrangement is established, it can be changed only with difficulty.

Most buildings have an extensive telephone wiring system already in place. It would be highly desirable to use these twisted-pair (TP), unshielded, wires to interconnect electronic equipment, such as computers, workstations, data entry terminals, and the like. Even in buildings being planned, it would be desirable to use ordinary TP telephone wires rather than coax cable because of the formers' ease of installation and lower cost per foot.

But these unshielded TP wires act as an antenna and are susceptible to external radio frequency (RF) energy. This RF noise can swamp a signal carried by the TP wires and thus they provide very poor signal-to-noise (S/N) ratios. Particularly, when long distances such as 300 feet are involved, as would be typical of a LAN.

S/N ratios can be improved by using very high signal transmission power levels, but FCC regulations specify maximum tansmission levels and high power tansmission is costly. A better solution is to provide a totally differential balanced receiver and to filter at transmission to fall within the FCC regulations, and filter at receiver which then eliminates bulk of external RF noise susceptibility.

The use of unshielded TP wires still msut overcome crosstalk noise. For instance, in a typical installation, a 25-pair bundle of wires may be used. Since these 25 pairs are in close proximity to each other, crosstalk noise can be substantial. This leads again to poor S/N ratios.

SUMMARY OF THE INVENTION

The instant invention permits use of unshielded TP wires for interconnecting electronic equipment in a LAN of up to 300 feet lineal distance. It allows transmission rates up to 10 million bits per second (mbps) without incurring significant error rates. Crosstalk noise is reduced (i) by the collision protocol employed in IEEE 802.3 LANs, and (ii) by employing two different drive levels.

The instant invention is employed in a distributed Star Topology LAN (STAR-LAN) as specified in a Premises Distribution System (PDS) in which an office is wired with unshielded TP wires used for both voice and data signals. A series of transceiver "Hubs" are interconnected by unshielded TP wires. Each Hub, in turn, is interconnected to a number of transceiver "Pods"; twelve in an exemplary embodiment, via unshielded TP wires. Each Hub performs a multiport repeating function. Each Pod serves as an interconnection point of a terminal equipment with the LAN, sometimes called a medium access unit (MAU). Each Pod is connected to its Hub by a four-wire full duplex pair of unshielded TP wires.

The invention permits the complete elimination of coax cable for interconnection of the electronic equipment on the LAN and the exclusive use of cheap, readily-available ordinary unshielded TP, telephone grade, wires. Thus easy installation, less-expensive per foot, less bulk, greater pliability than coax cable is obtained by the present invention. Moreover, additions, relocations, changes to the wiring network are readily performed because of the simple traditional techniques available with unshielded TP wire. Cable management is improved through the use of patch panel connections.

THe present invention calls for the Hub and Pod to transmit signals at different voltage levels so as to reduce crosstalk noise among TP wires in cables terminating at the Hub. In an exemplary embodiment, 25 unshielded TP wires terminate at a Hub and if no precautions are taken, crosstalk among the TP wires would result in very poor S/N ratios, thereby generating high bit error rates.

Because of the Carrier Sensed Multi-Access (CSMA) collision detect scheme defined by the IEEE 802.3 protocol, when more than one signal is received above the collision threshold by the Hub, transmission is stopped and must be restarted again. Accordingly, the protocol allows crosstalk noise to be ignored for reception by the Hub. The concern then, is with inducing crosstalk in the signals transmitted by the Hub into the attenuated signal transmitted by the Pod as received by the Hub. If a voltage level is used by the Hub for transmission equal to that of transmission by the Pod, crosstalk will be significant in signals received at the Hub. However, if different transmission voltage levels are used by the Hub and the Pod, there will be a substantial reduction in the crosstalk noise at the Hub. Accordingly, the bit error rate will become within acceptable tolerances, even at a 10 mbps bit transmission rate.

In one embodiment of the present invention, a 7-volt transmission level is employed at the Pod and a 4-volt transmisssion level at the Hub.

DETAILED DESCRIPTION OF A PREFERRED EMBODIMENT

Figure 1:
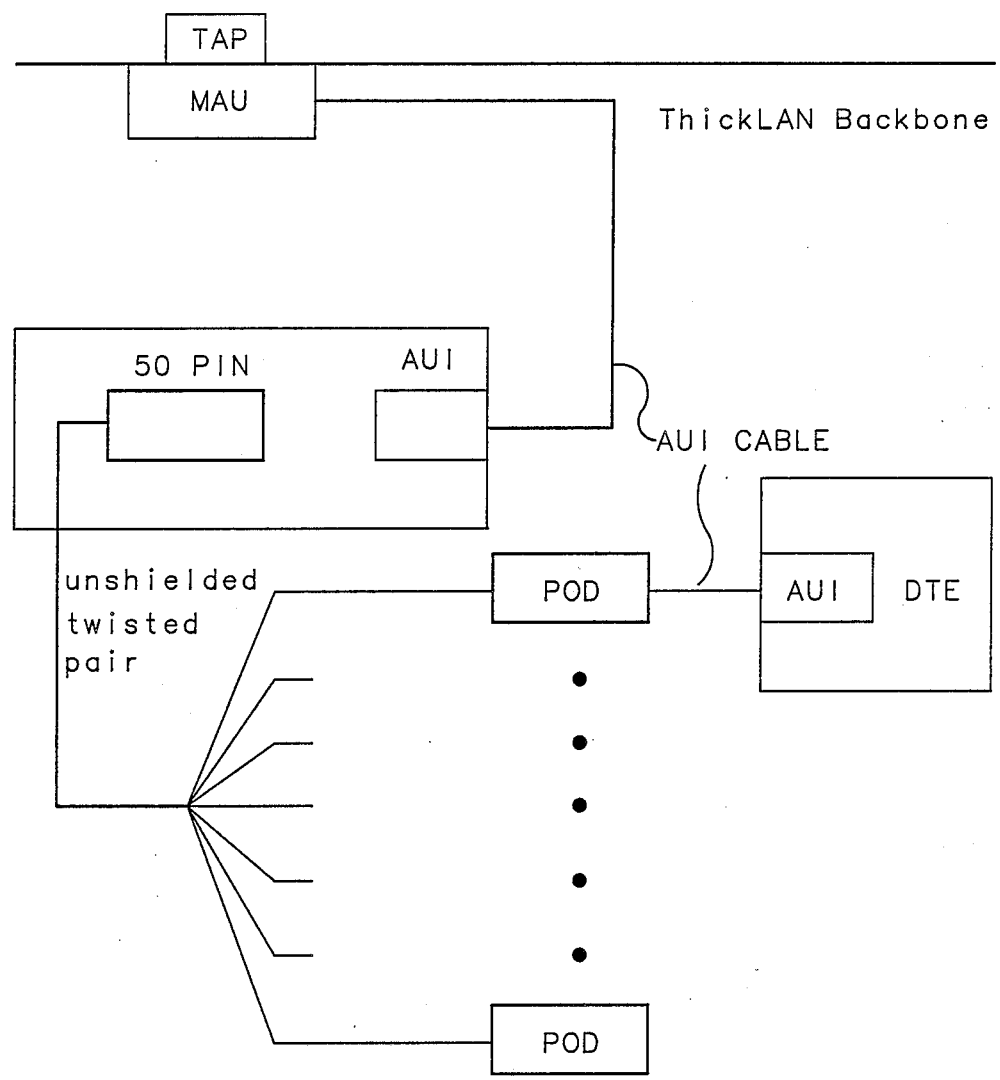
FIG. 1 is a block diagram showing a Hub-Pod configuration employed in a STAR-LAN topology, the Pod transmitting at a higher level than the Hub in accordance with the instant invention.

With reference to FIG. 1, a typical installation of a local area network (LAN) having a STAR topology is shown. A media access unit (MAU) 10 is shown tapped into a backplane 12 of the LAN. The backplane 12 may be a fiber optic cable, a coaxial cable or a twisted-pair of wires. The MAU 10 serves to connect a transceiver Hub 14 to the LAN backplane. The Hub 14 has an auxiliary uit interface (AUI) which receives an AUI cable 16 from MAU 10. The Hub 14 performs a repeating function between the LAN backplane 12 and a number of transceiver Pods 18 connected to the Hub.

In the LAN illustrated in FIG. 1, twelve Pods 18 are connected to the Hub 14 via twenty-four unshielded, twisted-pair (TP) wires 20. A 50-pin socket on the Hub serves to receive the 24 TP wires. Each Pod 18 is connected by two TP wires 20 to the Hub 14, thereby providing a four-wire full-duplex interconnection. Each Pod 18 is, in turn, connected to an AUI of a data terminal equipment (DTE) 22, via an AUI cable 24. Typical DTE is a microcomputer, a workstation, or a data entry terminal.

Both voice and data signals may be carried on the TP wires 20. Transmission rates up to 10 million bits per second (mbps) are to be supported by the LAN shown in FIG. 1. Up to 300 feet of lineal distance is possible between Hub 14 and DTE 22.

Familiarity with the IEEE 802.3 Local Area Network standards is helpful in understanding the invention. Especially pertinent is an understanding of the formatting of data into standard IEEE 802.3 packets. Reference can be had to a publication "Advanced Peripherals: IEEE 802.3 Local Area Network Guide" published by National Semiconductor Corp., copyright 1986, which publication is incorporated herein by reference.

Because 25 pairs of unshielded TP wires 20 come together in close proximity at the Hub 14, crosstalk is a significant concern. Such "near-end" crosstalk is related non-linearly to the number of adjacent unshielded TP wires. At the high transmission rates contemplated by the LAN employing the instant invention, errors will be induced by such crosstalk unless precautions are taken.

In accordance with the present invention, Hub 14 transmits at a lower voltage level than the Pod 18. In conjunction with the Carrier-Sensed Multi-Access/-Collision Detect (CSMA/CD0 protocol of the IEEE 802.3 standard, the invention decreases near-end crosstalk so that errors will not be significantly introduced into the LAN of FIG. 1.

When the Hub 14 receives a signal at any of its ports—either the AUI port or one of the 25 TP wires—it repeats it to all other ports. Significant multipair crosstalk noise is generated from the 24 TP wires 20 conducting the signal to their respective Pods 18. This crosstalk noise is picked up by the single TP wires conducting the (weaker) signal received by the Hub 14. Accordingly, errors may be introduced into the signal received by the Hub 14. In a typical installation, if the signal generated by a Pod is at a one-volt level, the signal received by Hub 14 is at a 300 millivolt level, and 100 millivolts (mv) of crosstalk noise may be introduced into this signal by the 24 other TP wires connected to the Hub 14. This results in a 3:1 S/N power ratio which is below IEEE 802.3 specifications.

Increasing the voltage level of the signal generated by the Pod 18 relative to that of the Hub 14, produces a higher S/N power ratio for the signal received by the Hub 14. Of course, this reduces the S/N power ratio for the signal received by the Pod 18. However, only one Pod 18 can be transmitting at a time, otherwise a collision is detected by Hub 14. Thus even though the Hub 14 is transmitting at a relatively lower power level than when it and the Pod 18 are transmitting at equal voltages, only one Pod signal is responsible for the presence of "near-end" crostalk as received by the other 24 pods from Hub 14. If Hub 14 receives signals from two or more Pods 18, the CSMA/CD protocol employed by Hub 14 will terminate the transmission by the Pods, in accordance with a collision "back off" procedure.

In accordance with the present invention then, employing a higher transmission voltage level by the Pod 18 than for the Hub 14, the signal-to-crosstalk noise ratio in signals received by the Hub 18 will be optimized, thereby reducing errors, even at 10 mbps rates.

The relative voltage levels according to the present invention depend on TP cable characteristics: letting

| | |
|---|---|
| $P\_RHUB$ = | Power Received at the HUB 14 |
| $P\_RPOD$ = | Power Received at the Pod 18 |
| $P\_THUB$ = | Power Transmitted at the Hub 14 |
| $P\_TPOD$ = | Power Transmitted at the Pod 18 |
| $P\_CTMP$ = | Power of multipair crosstalk at Hub 14 |
| $C\_CTMP$ = | Coefficient of multipair crosstalk at Hub 14 |
| $P\_CTIP$ = | Power of 1 pair crosstalk at Pod 18, and |
| $C\_CTIP$ = | 1 pair crosstalk coefficient. |

Then the object of the present invention is to maximize the signal-to-noise power ratio by using different transmit level to minimize multipair crosstalk effects.

$$\text{I.e., optimize } \frac{P\_RHUB}{P\_CTMP} = \frac{P\_RPOD}{P\_CTIP}$$

$$P\_RHUB = P\_TPOD - \text{attenuation in cable 20}$$

$$P\_RPOD = P\_THUB - \text{attenuation in cable 20}$$

$$P\_CTMP = P\_THUB * C\_CTMP$$

$$P\_CTIP = P\_TPOD * C\_CTIP$$

In general, then $$\frac{P\_RHUB}{P\_THUB} * C\_CTMP = \frac{P\_RPOD}{P\_TPOD} * C\_CTIP$$

or $$\frac{P\_TPOD}{P\_THUB} * C\_CTMP = \frac{P\_THUB}{P\_TPOD} * C\_CTIP$$

thus $$\frac{P^2\_TPOD}{P^2\_THUB} = \frac{C\_CTMP}{C\_CTIP} \qquad (\text{EQU. 1})$$

Typically, $C\_CTMP = -30\text{dB}$ $C\_CTIP = -40\text{dB}$

So EQU. 1 becomes $$\frac{P^2\_TPOD}{P^2\_THUB} = \frac{-30\text{dB}}{-40\text{dB}} = 10$$

$$\frac{P\_TPOD}{P\_THUB} = \sqrt{10} = 3.162$$

$$\frac{V\_TPOD}{V\_THUB} = \frac{\sqrt{P\_TPOD}}{\sqrt{P\_THUB}} = \sqrt{\frac{P\_TPOD}{P\_THUB}} = \sqrt{3.162} = 1.78$$

In accordance, then, with the instant invention, the voltage level employed by the Pod 18 for transmission to the Hub 14 is approximately 1.78 times that of voltage level employed by Hub 14 for transmission to Pod 18. For instance if a peak-to-zero voltage level of 7 volts is employed by the Pod, a peak-to-zero voltage level of 4 volts would be employed by the Hub.

What is claimed is:

1. In a network including a first transceiver and two or more second transceivers, each connected to said first transceiver by unshielded twisted-pair wires, said first transceiver receiving from at least one of said second transceivers a sequence of signals and retransmitting said sequence to other said second transceivers, said second transceiver transmitting said sequences at a predetermined second voltage level, said first transceiver retransmitting said sequence at a predetermined first voltage level; a method for reducing crosstalk comprising the steps:
  (a) receiving by said first transceiver a sequence of signals from one of said second transceivers; and
  (b) retransmitting by said first transceiver said sequence at said first voltage level, having a level different than said second voltage level.

2. A crosstalk reducing method according to claim 1 wherein said first and second voltage levels are related by the formula:

$$\frac{V\_SECOND}{V\_FIRST} = \sqrt{\frac{P\_TSECOND}{P\_TFIRST}}$$

where P_TSECOND and P_TFIRST is the power transmitted by said second transceiver and said first transceiver, respectively, and where $$\frac{P\_TSECOND}{P\_TFIRST} = \sqrt{\frac{C\_CTMP}{C\_CTIP}}$$

where C_CTMP and C_CTIP is the coefficient of multipair crosstalk and the coefficient of one-pair crosstalk, respectively, at said first transceiver and said second transceiver, respectively.

3. A crosstalk reducing method according to claim 1 wherein said second predetermined voltage level exceeds said first predetermined voltage level.

4. A crosstalk reducing method according to claim 1 wherein said first and second transceivers each employ a collision detection technique having a predetermined collision threshold, said method further including the step:
  (c) ceasing said retransmission upon
    (i) completion of said signals comprising said sequence, or
    (ii) reception by said first transceiver of signals from at least two said second transceivers whereby said collision threshold is exceeded.

* * * * *

UNITED STATES PATENT AND TRADEMARK OFFICE
CERTIFICATE OF CORRECTION

PATENT NO. : 4,875,205

DATED : October 17, 1989

INVENTOR(S) : Fred G. Huang

It is certified that error appears in the above-identified patent and that said Letters Patent is hereby corrected as shown below:

Abstract, line 13, "IEEE 802,3" should read -- IEEE 802.3 --

Column 1, line 55, "still msut overcome" should read -- still must overcome --

Column 2, line 28, "THe present" should read -- The present --

Column 3, line 4, "auxiliary uit" should read -- auxiliary unit --

Column 4, line 3, "crostalk as" should read -- crosstalk as --

Signed and Sealed this

Twentieth Day of November, 1990

*Attest:*

HARRY F. MANBECK, JR.

*Attesting Officer*  *Commissioner of Patents and Trademarks*